United States Patent
French

(10) Patent No.: US 9,956,849 B2
(45) Date of Patent: May 1, 2018

(54) MOTION DRIVEN COOLING SYSTEM

(71) Applicant: Joseph A. French, River Oaks, TX (US)

(72) Inventor: Joseph A. French, River Oaks, TX (US)

( * ) Notice: Subject to any disclaimer, the term of this patent is extended or adjusted under 35 U.S.C. 154(b) by 0 days. days.

(21) Appl. No.: 15/116,813

(22) PCT Filed: Aug. 11, 2015

(86) PCT No.: PCT/US2015/044684
§ 371 (c)(1),
(2) Date: Aug. 4, 2016

(87) PCT Pub. No.: WO2016/073050
PCT Pub. Date: May 12, 2016

(65) Prior Publication Data
US 2017/0174047 A1     Jun. 22, 2017

Related U.S. Application Data

(60) Provisional application No. 62/074,161, filed on Nov. 3, 2014.

(51) Int. Cl.
*B60H 1/32* (2006.01)
*B60H 1/00* (2006.01)
(Continued)

(52) U.S. Cl.
CPC ........... *B60H 1/3202* (2013.01); *A01D 34/00* (2013.01); *A61G 5/10* (2013.01); *B60H 1/00264* (2013.01);
(Continued)

(58) Field of Classification Search
CPC .............. B60H 1/3202; B60H 1/00264; B60H 1/00421; B60H 1/00428; B60H 1/00378;
(Continued)

(56) References Cited

U.S. PATENT DOCUMENTS

| 418,933 A | * | 1/1890 | Sommerville | ............ F03D 7/06 416/55 |
| 645,482 A | * | 3/1900 | Mills | ........................ F03D 7/06 280/304.2 |

(Continued)

FOREIGN PATENT DOCUMENTS

| DE | 555745 | 7/1932 |
| DE | 102013006101 A1 | 10/2014 |

OTHER PUBLICATIONS

International Search Report and Written Opinion of the ISA (US), dated Oct. 29, 2015, 6 pages.
(Continued)

*Primary Examiner* — Emmanuel Duke
(74) *Attorney, Agent, or Firm* — Law Office of Jeff Williams; J. Oliver Williams

(57) ABSTRACT

A motion driven cooling system configured to operate with one or more transportation devices. The motion driven cooling system includes a moving object in communication with a transportation device. The moving object transfers power from the movement of the transportation device and operates a water pump system and a fan system. The cooling system includes a water housing configured to retain water. The water pump communicates with the moving object and is configured to move water from the water housing to a second location where the water passes through one or more elements and returns to the water housing. The fan communicates with the moving object and is configured to move air across the water at the second location so as to lower the temperature of the air. An outlet port directs the flow of air as desired.

18 Claims, 14 Drawing Sheets

(51) Int. Cl.
*A01D 34/00* (2006.01)
*B62B 9/00* (2006.01)
*A61G 5/10* (2006.01)
*A01D 101/00* (2006.01)

(52) U.S. Cl.
CPC ..... *B60H 1/00378* (2013.01); *B60H 1/00407* (2013.01); *B60H 1/00421* (2013.01); *B60H 1/00428* (2013.01); *B62B 9/00* (2013.01); *A01D 2101/00* (2013.01); *A63B 2225/66* (2013.01)

(58) Field of Classification Search
CPC ...... B60H 1/00407; A61G 5/10; A01D 34/00; B62B 9/00; A63B 2225/66
See application file for complete search history.

(56) References Cited

U.S. PATENT DOCUMENTS

| | | | |
|---|---|---|---|
| 2,498,973 A | 2/1950 | Whiteley | |
| 2,648,272 A | 8/1953 | Norton | |
| 2,705,623 A * | 4/1955 | Glassenhart | B60H 1/3202 180/53.7 |
| 4,555,911 A * | 12/1985 | Kusisto | B62J 33/00 280/828 |
| 4,953,831 A | 9/1990 | Albrecht | |
| 6,151,907 A * | 11/2000 | Hale | B60H 1/32 62/304 |
| 6,196,474 B1 * | 3/2001 | Hillerson | B05B 9/0805 222/608 |
| 8,500,150 B2 * | 8/2013 | Cho | B62M 6/90 180/53.61 |
| 2007/0089448 A1* | 4/2007 | Critchfield | B60H 1/00407 62/304 |
| 2014/0238792 A1 | 8/2014 | Moore | |

OTHER PUBLICATIONS

Extended European Search Report in European counterpart Application No. 15857500.1-1762 / 03086960, completed by European Patent Office, dated Feb. 20, 2017.

* cited by examiner

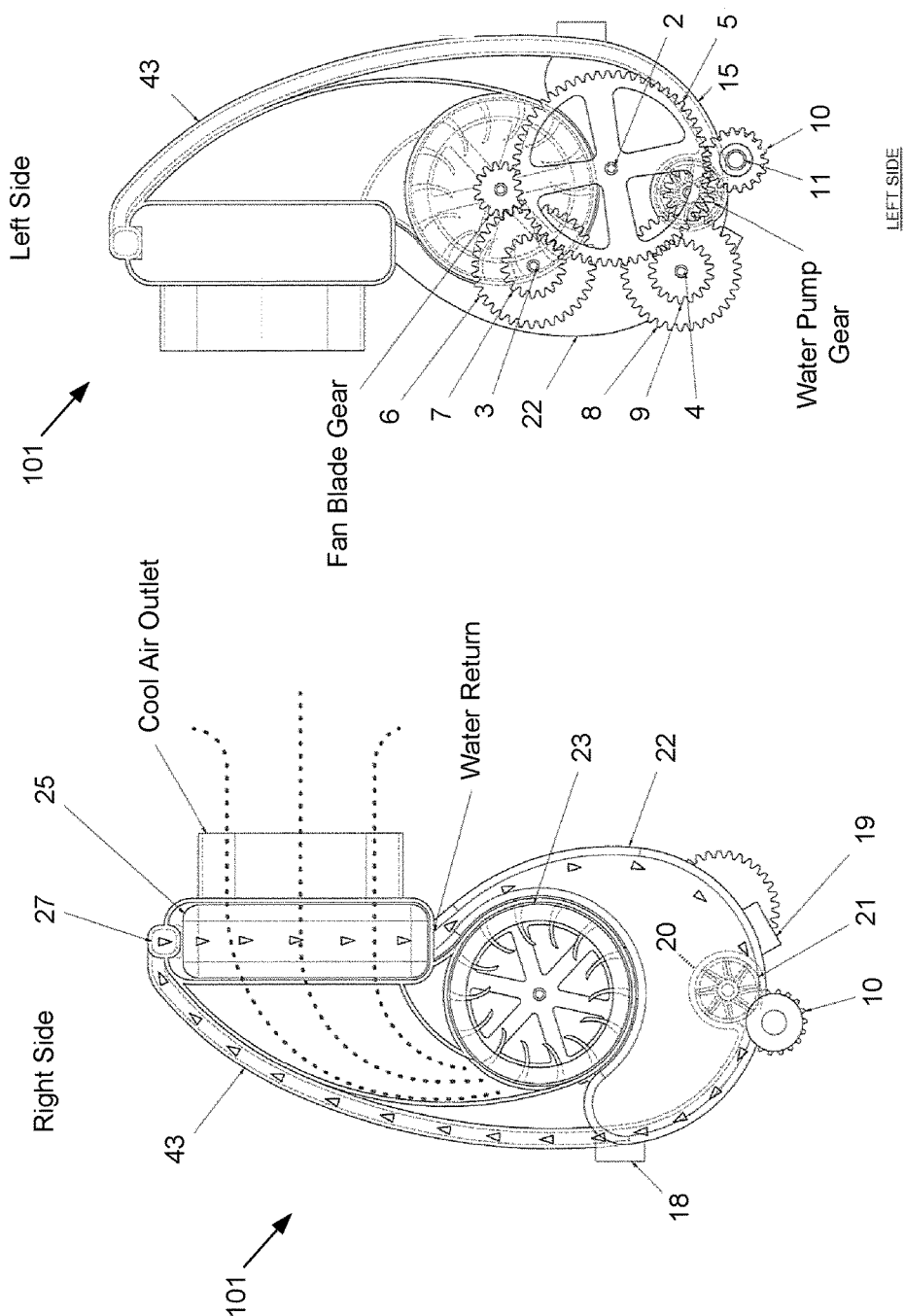

| | | PARTS LIST |
|---|---|---|
| ITEM | QTY | DESCRIPTION |
| 1 | 1 | GEAR HOUSING |
| 2 | 1 | AXLE FOR GEAR (NUMERAL 5) |
| 3 | 1 | AXLE FOR GEAR (NUMERAL 7) |
| 4 | 1 | AXLE FOR GEAR (NUMERAL 9) |
| 5 | 1 | GEAR MOUNTED ON (NUMERAL 2) |
| 6 | 1 | GEAR (INFUSED TO/WITH GEAR NUMERAL 7, ROTATING ON NUMERAL 3) |
| 7 | 1 | GEAR (INFUSED TO/WITH GEAR NUMERAL 6, ROTATING ON NUMERAL 3) |
| 8 | 1 | GEAR (INFUSED TO/WITH GEAR NUMERAL 9, ROTATING ON NUMERAL 4) |
| 9 | 1 | GEAR (INFUSED TO/WITH GEAR NUMERAL 8, ROTATING ON NUMERAL 4) |
| 10 | 1 | GEAR (INFUSED TO/WITH AXLE PART NUMERAL 11) |
| 11 | 1 | AXLE PART (HOLLOW SO THAT WIDTH OF AXLE CAN BE ADJUSTED) |
| 12 | 2 | SET SCREW |
| 13 | 1 | AXLE WIDTH ADJUSTING INSERTS (THAT CAN BE SET O WIDTH NEEDED FOR TIRE CONTACT) |
| 14 | 1 | APPARATUS AXLE MOUNT |
| 15 | 1 | COURSE HORIZONTAL CYLINDER (FIXED TO THE AXLE WIDTH ADJUSTING INSERTS NUMERAL 13) |
| 16 | 1 | ADJUSTABLE APPARATUS MOUNTING ROD |
| 17 | 4 | APPARATUS MOUNTING MECHANISM |
| 18 | 1 | WATER INLET |
| 19 | 1 | WATER DRAINAGE PLUG |
| 20 | 1 | WATER PUMP HOUSING |
| 21 | 1 | WATER PUMP BLADE |
| 22 | 1 | WATER CONTAINMENT |
| 23 | 1 | FAN |
| 24 | 1 | INTERNAL FAN HOUSING |
| 25 | 1 | MESH (FOR WATER TO DRIP DOWN THE SURFACE OF) |
| 26 | 1 | WATER OUTLET PORTS |
| 27 | 1 | WATER OUTLET MANIFOLD |
| 28 | 1 | APPARATUS HOUSING |
| 29 | 1 | EXITING AIR DUCTS/VENTS |
| 31 | 1 | SPRING (FOR DOWNWARD APPARATUS PRESURE FOR OPTIMAL COURSE HORIZONTAL CYLINDER) |
| 32 | 4 | APPARATUS MOUNT |
| 41 | 1 | FOLD DOWN AIR VENT |
| 43 | 1 | TUBE FEEDING WATER MANIFOLD FROM WATER PUMP |

FIG. 6

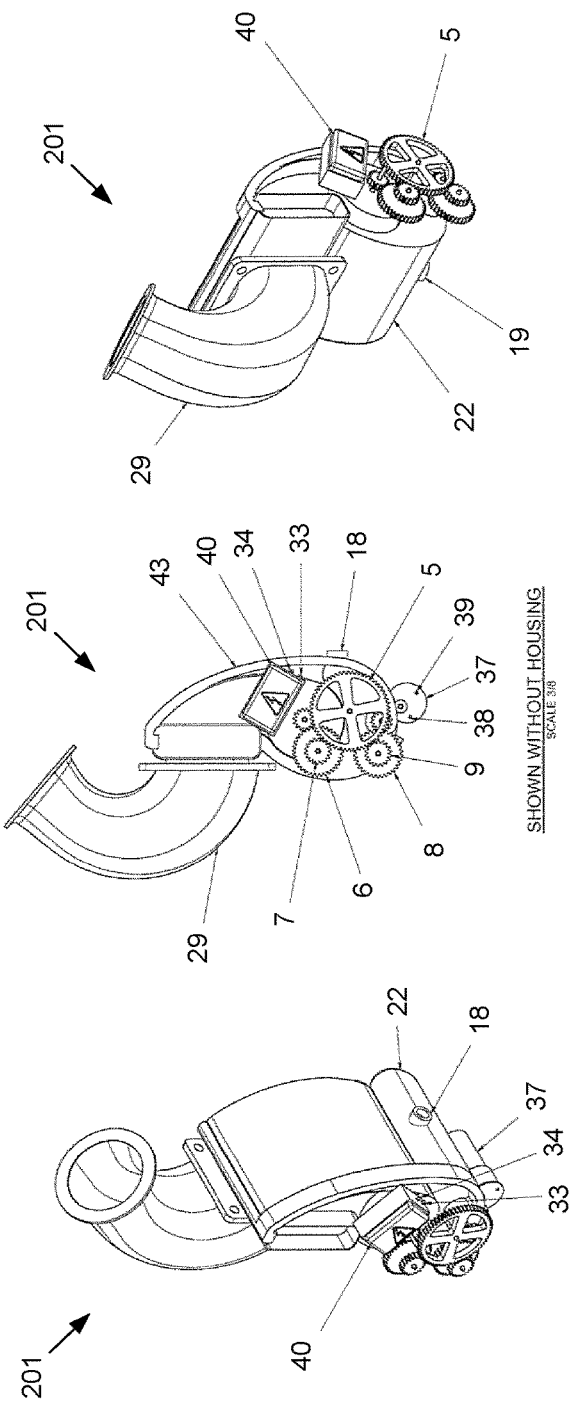

Telescoping Attachment w/ set screw lock

Adjustable Louvers

Three Point Handlebar Mounts

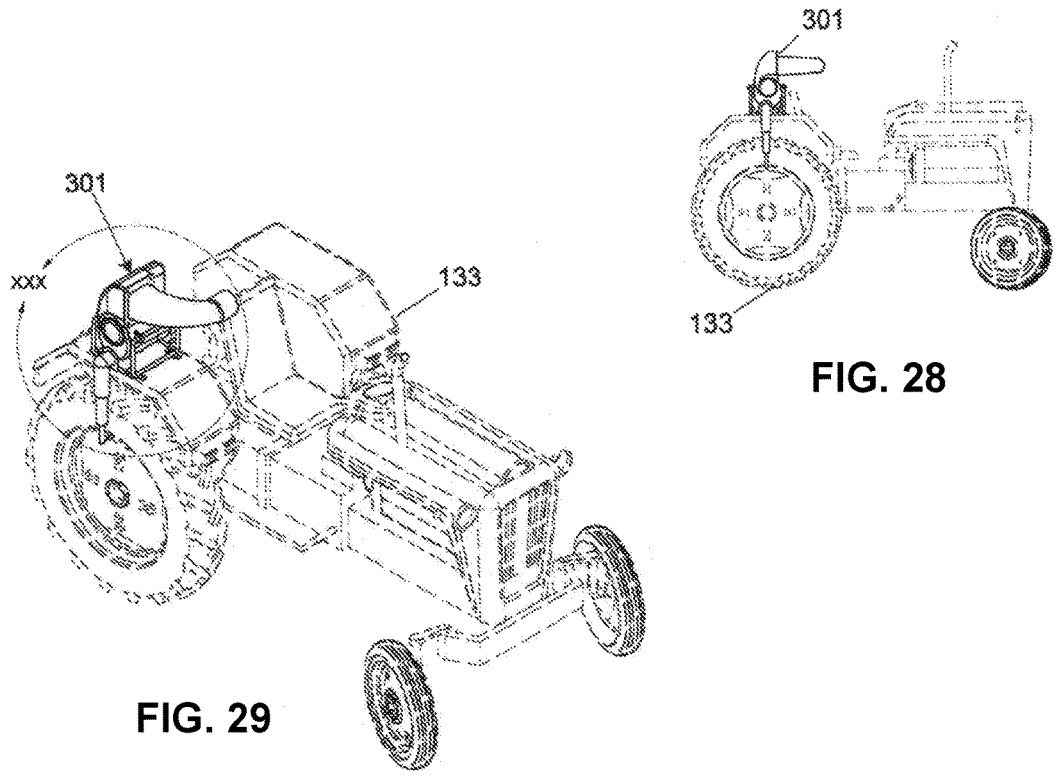
FIG. 28
FIG. 29
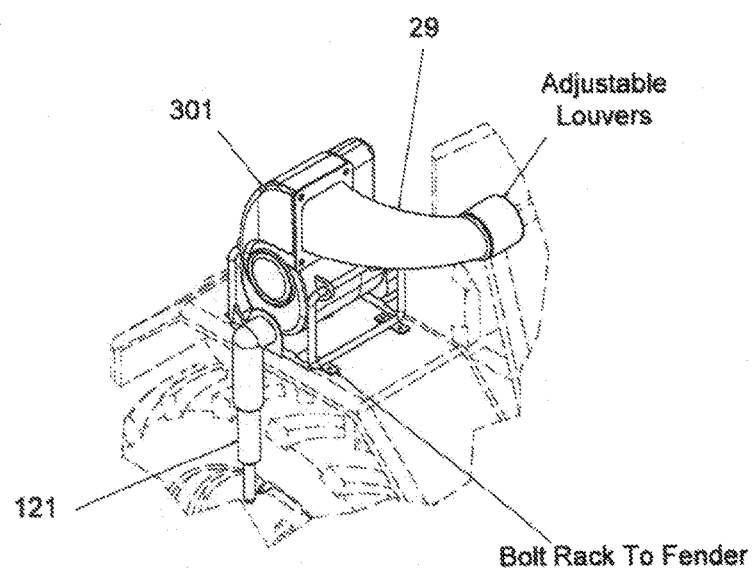
FIG. 30

MOTION DRIVEN COOLING SYSTEM

TECHNICAL FIELD

The present application relates generally to a cooling system, and in particular to a cooling system operated by movement of a primary device.

DESCRIPTION OF THE PRIOR ART

Air conditioning is a relatively recent invention last century. Air conditioning is seen most prevalently in homes or offices and in automobiles or other mass transit systems. However, cooling systems are not prevalent for tasks performed outdoors using smaller scaled transportation devices or mobile equipment. For example, such smaller scaled devices can be strollers, golf carts, all-terrain vehicles, bicycles and bicycle trailers, lawn equipment, wheelchairs, and heavy equipment. The problem that people face when using these particular devices for outdoor tasks in hot weather is how to keep cool. Of great concern is the safety of the elderly and small children, along with those having potentially susceptible health conditions. These devices are not configured to have large engines or any engine in some cases in which to power a cooling system.

Each device typically transports an individual from one location to another. But they fail in regulating or providing cool air to moderate the effects of summer heat. For example, the stroller transports a small child, but the child is in the stroller without any cool air. Additionally, sometimes a shade is used with the stroller to block sunlight but such shade also can prevent adequate airflow to keep the child properly cool. The ability to regulate the temperature of the stroller could permit the mother of a small child greater flexibility during the hottest parts of the day.

Many attempts have been made to provide some level of comfort when operating any of the above mentioned devices in hot weather. It is common to see portable fans, cool pads, breathable fabric, and others. Each operates as a bandage but not the cure. Although great strides have been made in the area of cooling systems, considerable shortcomings remain.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIGS. 3 and 4 are alternate side views of the motion driven cooling system of FIG. 1;

FIG. 6 is a table of parts used in the motion driven cooling system of FIG. 1;

FIGS. 11-13 are side and perspective views of an alternative embodiment of the motion driven cooling system of FIG. 1;

FIG. 14 is a table of parts used in the motion driven cooling system of FIGS. 10-12;

FIGS. 24-34 are side and perspective views of a secondary alternative embodiment of the motion driven cooling system of FIG. 1 and an alternative attachment device coupled to a plurality of different transportation devices.

Figure 1:
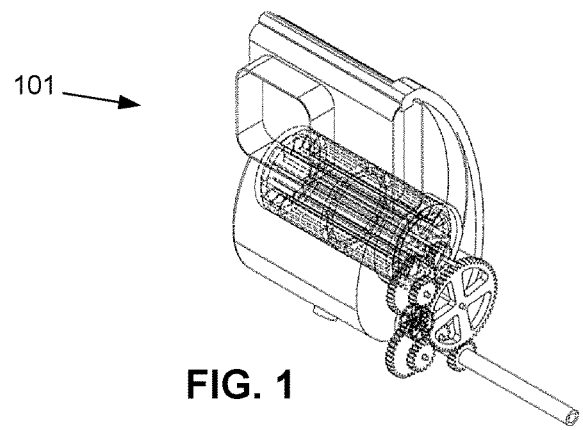
FIG. 1 is a perspective view of a motion driven cooling system according to the preferred embodiment of the present application.
Figure 2:
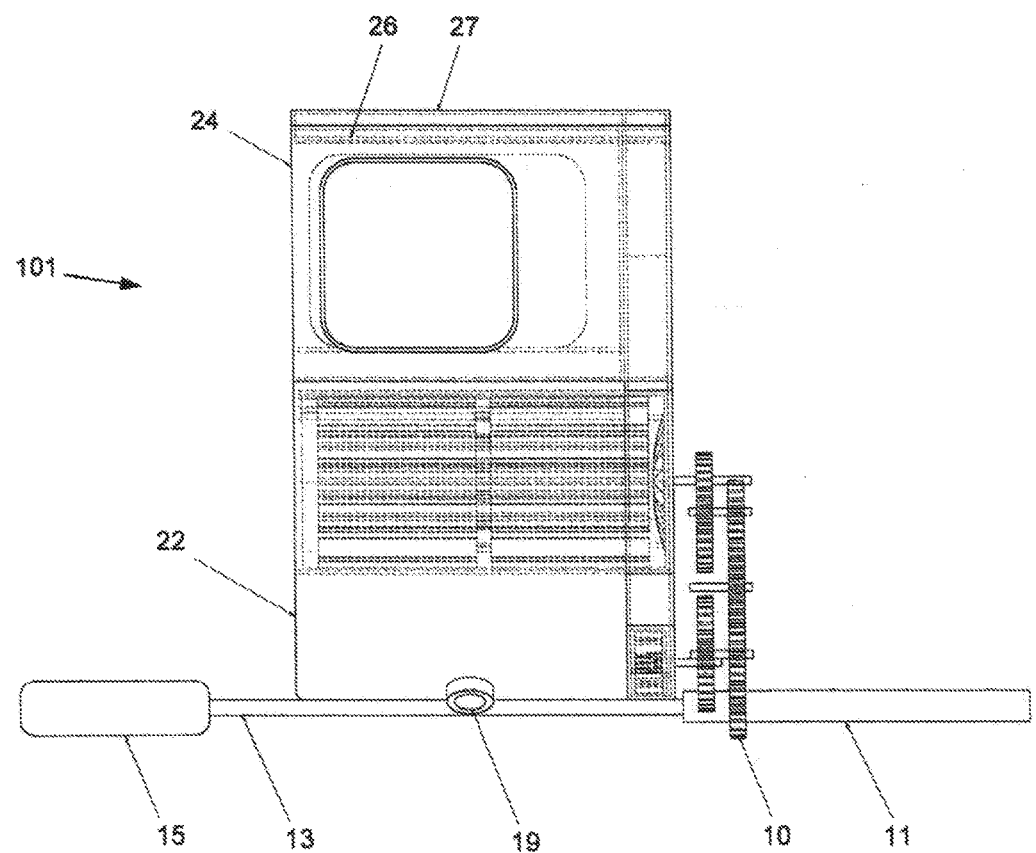
FIG. 2 is a front view of the motion driven cooling system as seen in FIG. 1.
Figure 5:
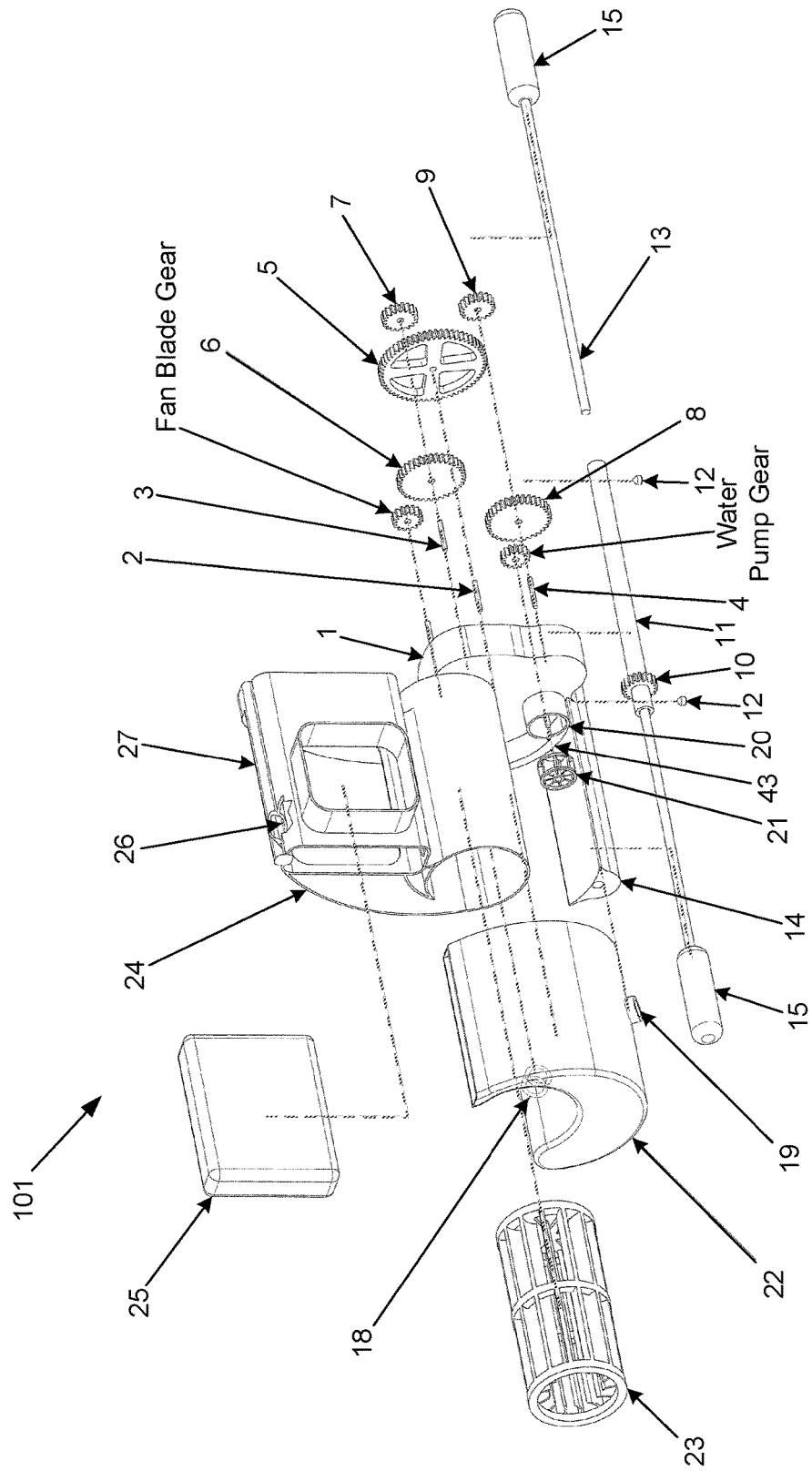
FIG. 5 is an exploded view of the motion driven cooling system of FIG. 1.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system and method of use in accordance with the present application overcomes one or more of the above-discussed problems commonly associated with providing cooling comfort to individuals outdoors in the heat. Specifically, the system of the present application is configured to provide cooling effects to individuals from the motion of the transportation device or mobile equipment. These and other unique features of the system are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

A motion driven cooling system is configured to operate with one or more transportation devices. Transportation devices typically include those devices, equipment, and/or vehicles that are typically operable by a single person and not used for mass transportation. Examples may include a lawn mower, a stroller, a golf cart, an all-terrain vehicle, a bicycle, and a piece of workout equipment, and so forth. The motion driven cooling system of the present application is configured to harness movement from the devices and convert that energy into the generation of controlled cooling airflow wherein the temperature of the airflow is lower than the ambient adjacent air. The cooling airflow is directed onto and blown on the operator or on a passenger.

As seen in the accompanying drawings, the motion driven cooling system is configured to use different types of attachment members to permit it to attach and detach from various devices. This allows for selective use, ease of maintenance, and versatility of the cooling system. For example, a user may remove the cooling system from a stroller and attach it to a lawn mower for use while completing yard work.

The motion driven cooling system includes a rotatable member in communication with a transportation device. The rotatable member receives energy from a wheel or other moving object of the device and directs the energy to efficiently generate the cooling airflow. For example, as a person works-out on a piece of exercise equipment or pushes a stroller, the moving object receives power in the form of motion from the transportation device. The power is used to operate a water pump and a fan. The water pump is configured to move water from a water housing to a second location where the water passes through one or more elements and returns back again to the water housing. The fan is configured to move air across the water at the second location so as to lower the temperature of the air. An outlet port directs the flow of air as desired. The temperature of the air lowers as the air moves across the water. Some alternative embodiments may permit the use of auxiliary power supplies (i.e. battery) that continue to operate the pump and fan even when the transportation device is not in motion. As seen in some of the figures, the method of operation of the rotatable member may be adjusted depending on the type of device it is associated with.

Harnessed energy may be derived from any type of movement, such as rotation or translation of any portion of the transportation device. Additional components used to ensure adequate and reliable transfer of energy are: Chain/s and sprocket/s, pulleys, gears, pistons, telescoping wheel contacts, or any other means necessary to drive the cooling system. The cooling system may include any one mechanism singled out to drive another, such as: a water pump driving a fan through pressurized water; a fan driving a water pump by way of forced air. Kinetic/rotation from the friction and pressure on tires, wheels, axles or separate axles, or any added means of harnessing the kinetic rotation or translation may be utilized to produce the energy needed to power the cooling system.

It is understood that any type of fan or water pump can be utilized in the cooling portion of the cooling system. Additionally, this cooling system is operable with a stroller and many other transportation devices. Although a stroller is illustrated in the drawings, it is understood that other types of transportation devices, such as those listed above are equally compatible and contemplated.

The motion driven cooling system of the present application is a system that blows cooled airflow to a user, using the motion of the apparatus to turn one or more fans and/or water pumps via a system of gears/gearing, chains, pulleys, pistons, to receive and transfer friction/kinetic via any moving object (i.e. rotation via tires, wheels or one or more axles, or any combination of any of these sources) that can be used to result in air being cooled and dispersed.

The motion driven cooling system of the present application produces a cooling effect by passing air over, through, and/or around water. The motion driven cooling system produces cooling via evaporated water/air, paired and working in sync with a multitude of commonly used elements or devices in their normal operations. Users are able to receive increased comfort from the cooled airflow while being in the heat. For example, children may ride in a stroller during the summer but have a cool breeze blowing on them to keep them cool and regulate their body temperature. Cool air may be provided to a user as he/she golfs while moving around a golf course on a golf cart. The portability of the motion driven cooling system permits a user to attach it to conventional carts, vehicles, mowers, strollers, bicycles, and so forth without modification to the transportation device itself.

Referring now to FIGS. 1-34 wherein like reference characters identify corresponding or similar elements in form and function throughout the several views. The following Figures describe a motion driven cooling system 101 configured to transfer energy from translational movement to power one or more systems to produce a cooling airflow to comfort a user and passenger. System 101 is configured to be adaptable and operable with one or more types of transportation devices as seen in the figures. System 101 may be integrally formed into the transportation device or be detachable through the use of one or more attachment members.

FIG. 1 is a perspective view of system 101 in a simplistic form. FIGS. 2-5 show system 101 in more detail. FIG. 6 is a table providing callouts and the associated identification as used in FIGS. 2-5 and some of the remaining Figures. System 101 includes a fan system and a water pump system. The fan system is configured to create a flow of air. The water pump system is configured to pump water from a containment area to come in contact with the airflow from the fan system. The airflow is cooled by the water and directed to an end location through ducts.

The fan system includes a fan housing 24 that has a fan 23 and one or more internal passages for the acceptance of air and for the pushing and escaping of air. When operating, fan 23 pulls ambient air and pushes it through housing 24 passed exposed water. Apparatus housing 28 depicts a body which carries many functions molded into its design. The body 28 envelopes fan housing 24 and provides holes and perforations for an air inlet (not shown in drawings). The fan housing 24 also holds the function of directing the cycled water run-off coming off from its traveling down mesh 25 and back into the water housing 22.

The water pump system includes a pump with blade 21 used to drive and move water from a standing position in the bottom of housing 22 to an elevated position above the fan system. Below the fan 23 is the water housing 22. This water housing provides a water inlet 18 and water drainage 19. The water pump blade and its housing 21 and 20 are set to the lowest point of the water housing 22. This allows the water to continue to be supplied to the water pump if the water housing 22 is running low on water. When the water is pumped as it passes up a tube 43 leading from the water pump. The water is pumped up tube 43, feeding water manifold 27. Water manifold 27 disperses the influx of water out and over a vertically-standing mesh 25 material. Mesh 25 is configured to cover the outlet of housing 24. Water is permitted to fall through mesh 25, thereby saturating mesh 25, and pass down back into housing 22 for recirculation via pump 21. The passing of ambient airflow through saturated mesh 25 results in a temperature drop in the airflow after mesh 25 compared to the temperature of the airflow prior to mesh 25. This cooling airflow may be directed through ducts 29 to blow on and regulate the comfort of one or more individuals.

The fan system and the water pump system is powered through a power generation assembly. The assembly includes at least any number of axles 2-4, gears 5-10, axle 11, and cylinder 15. The assembly is used to convert the kinetic energy of a moving transportation device into usable energy to power the fan system and the water pump system. Gear 10 is rotated by way of friction and kinetic energy resulting from motion of the transportation device. This may include tire rotation. Gear 10 also depicts a mechanism in communication with gear 10 to drive sequential gears 5-9 when the transportation device is in motion. When not in motion, gears 5-10 do not move. Gears 5-10 are configured to work in a single direction, meaning when the transportation device is moving in a single direction (i.e. forward). System 101 does not operate when the transportation device is moving backwards. This is so the gears 5-10 do not strip or break when the transportation device is suddenly stopped or reversed. Pad/cylinder 15 is used to engage a portion of the transportation device and provide the rotational energy to gears 5-10. For example, pad 15 may contact the tires of the transportation device.

Gear 10 is fixed to axle 11 which is adjustable in length. Axle 11 provides a hollow center for the two axle inserts 13 on either side. Pad 15 (a course horizontal cylinder fixed to the axle) will be adjusted to contact the transportation device at the desired location. For example, on a stroller pad 15 may be adjusted to set center to center on the tires highest point of contact. When pad 15 is in position, its placement can be secured to the axle using set screw 12. It is understood that the location of pad 15 in relation to the tires is selectable by the user. Other radial locations may be used. It is also understood that system 101 may use one or more inserts 13.

Gear housing 1 depicts that it provides axles 2-4 for the series of gears 5-9. Gear housing 1 is positioned into an inverted slot molded into a shell embodiment that makes up a portion of system 101, where it is then fixed into place. The embodiment has holes where the cooling system's function gears (fan blade gear and water pump gear) can be accessed. The fan blade gear and water pump gear are fit with the fan blade and water pump axles, thus setting the fan 23 and the water pump with its connected housing.

Figure 8:
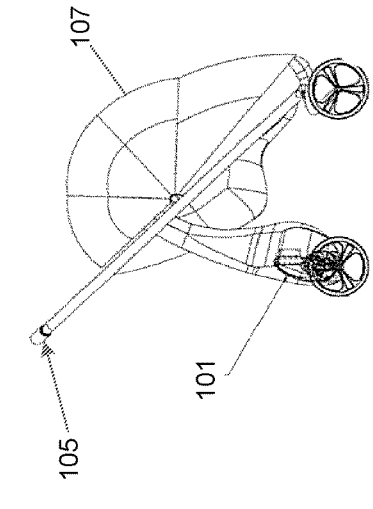
FIGS. 7-10 are views of the motion driven cooling system of FIG. 1 associated with a stroller.
Figure 10:
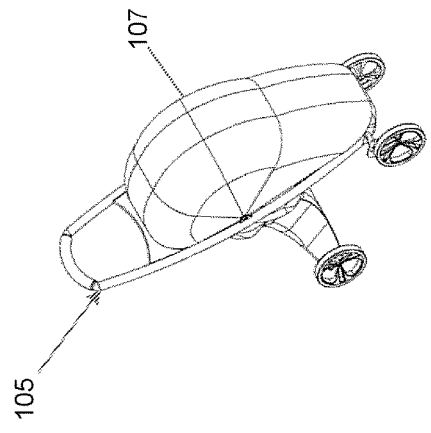
Figure 7:
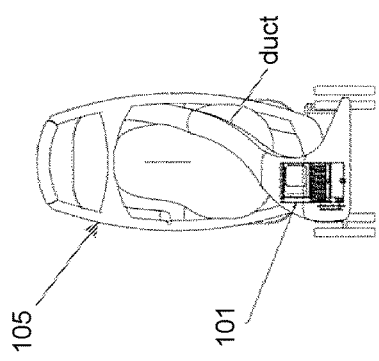
Figure 9:
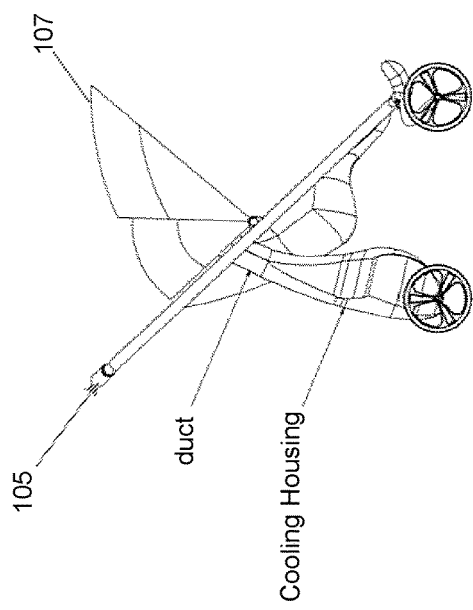

Referring now to FIGS. 7-10 in the drawings, assorted views of system 101 is illustrated, wherein system 101 is integrated into a stroller 105. As stated previously, system 101 is configured to operate with one or more transportation devices. Stroller 105 is an example of a transportation device. In this embodiment system 101 is configured to engage the rear tires of stroller 105. Stroller 105 includes a cooling housing to surround system 101. Further integrated into stroller 105 is a duct passing upward from system 101 and into the child compartment area. Stroller 105 further includes a shade canopy 107 that is configured to alternate between an open and closed position. FIG. 9 illustrates canopy 107 in an open position. FIGS. 8 and 10 illustrate canopy 107 in a closed position.

Referring now also to FIGS. 11-14 in the drawings, an alternative embodiment of system 101 is illustrated. System 201 is similar in form and function to that of system 101 except herein described. As noted previously, a potential limitation of system 101 is that such system tended to operate only when the transportation device was in motion since the movement of the transportation device was used to rotate pads 15. It is understood that it may be desired that the cooling airflow be available while the transportation device remains stationary. Therefore, system 201 includes the use of a power supply 40 (i.e. battery).

Power supply 40 is electrically coupled to a motor 37 and is configured to provide electrical power to run a motor 37. When power is received from power supply 40, motor 37 induces energy into gears 5-9 to provide cool air. System 201 includes motor 37 used to rotate gears 5-9. Power supply 40 and motor 37 are connected between contacts 33,34 and poles 38,39. Power supply 40 may optionally be configured to accept power to permit recharging. Such recharging may be provided through the movement of the transportation device and pad 15. An automated switch may be used to selectively supply power from power supply 40 to motor 37 as movement of transportation device ceases, so as to prevent interruption of and maintain the continuous supply of cooler airflow. Therefore, system 101 is configured to permit a user to switch back and forth between a kinetic mode (movement operated) and battery mode (power through power supply).

Figure 15:
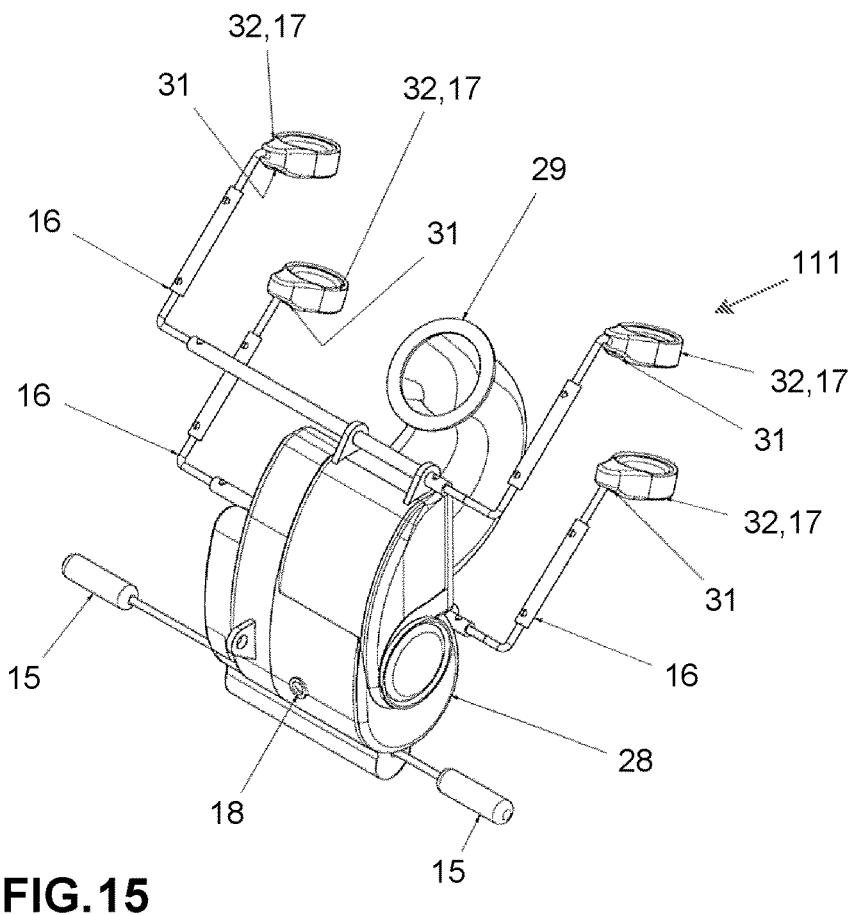
FIGS. 15-16 are perspective and side views of the motion driven cooling system of FIG. 1 with an attachment device.
Figure 16:
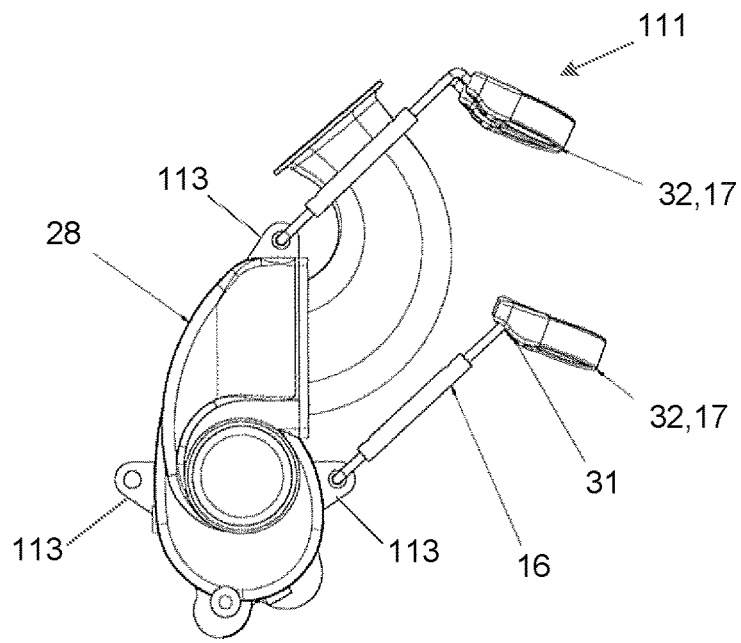
Figure 17:
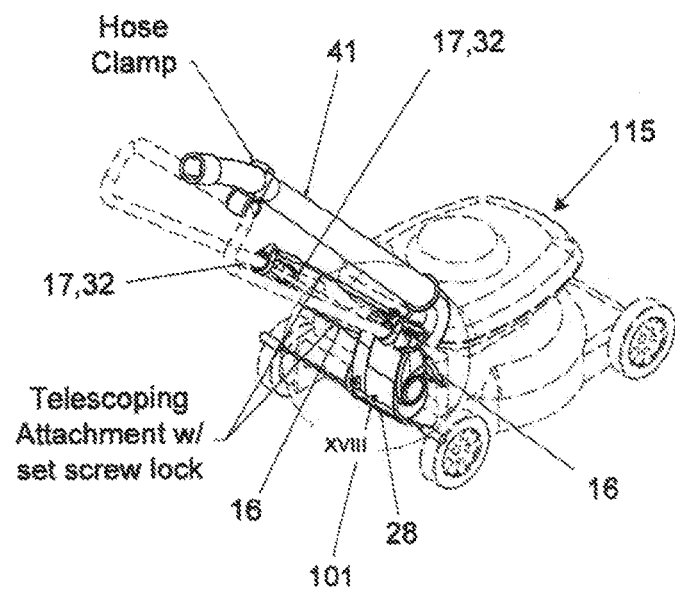
FIGS. 17-23 are various views of the motion driven cooling system of FIG. 1 coupled to a plurality of different transportation devices.
Figure 18:
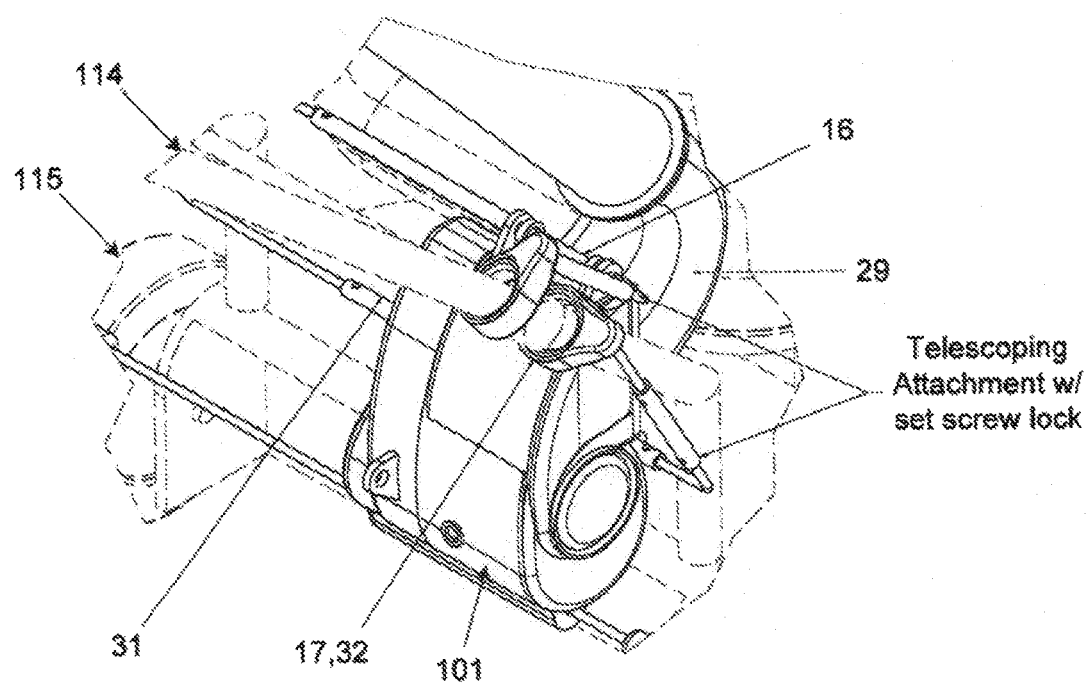

Referring now to FIGS. 15 and 16 in the drawings, perspective and side views of motion driven cooling system 101 with an attachment device 111. Device 111 is configured to provide a plurality of methods of attaching to a transportation device. As seen in FIGS. 7-10 previously, system 101/201 may be integrally formed within a stroller. However, it is understood that system 101/201 may be configured to permit for interchangeability between transportation devices. For example, system 101/201 may be coupled to a conventional stroller during a walk outdoors but then be removed and coupled to a bike trailer later. To permit this functionality, system 101/201 may further include attachment device 111. Although it is understood that system 201 is configured to operate with device 111, for ease of illustration, discussion will be centered on system 101 hereon.

Attachment device 111 is configured to pass through one or more brackets 113 in association with housing 22, 24, and/or 28. Device 111 includes an adjustable length mounting rod 16, a mounting mechanism 17, a spring 31, and a mount 32. Rod 16 is configured to located mechanism 17 and mount 32 in a plurality of locations relative to system 101. Mount 32 is configured to rotate and pivot relative to rod 16. Mechanism 17 and spring 31 are used to provide a clasping force through mount 32 sufficient to grip an object. The maneuverability of rod 16 with the relative motion of mechanism 17 and mount 32 allow for unlimited positions and attachment locations to transportation devices.

Figure 19:
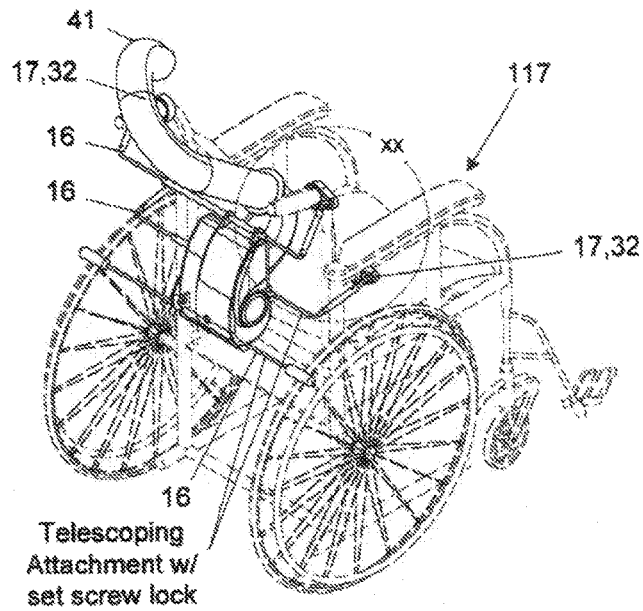
Figure 20:
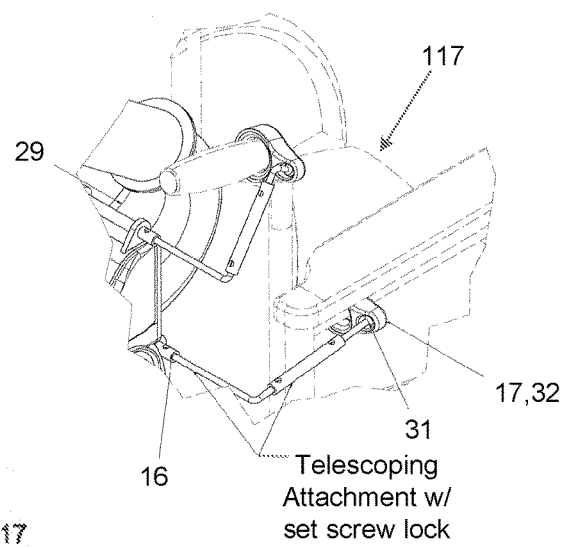
Figure 21:
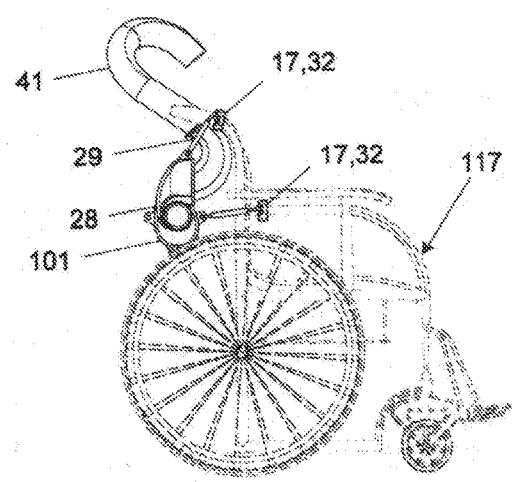
Figure 22:
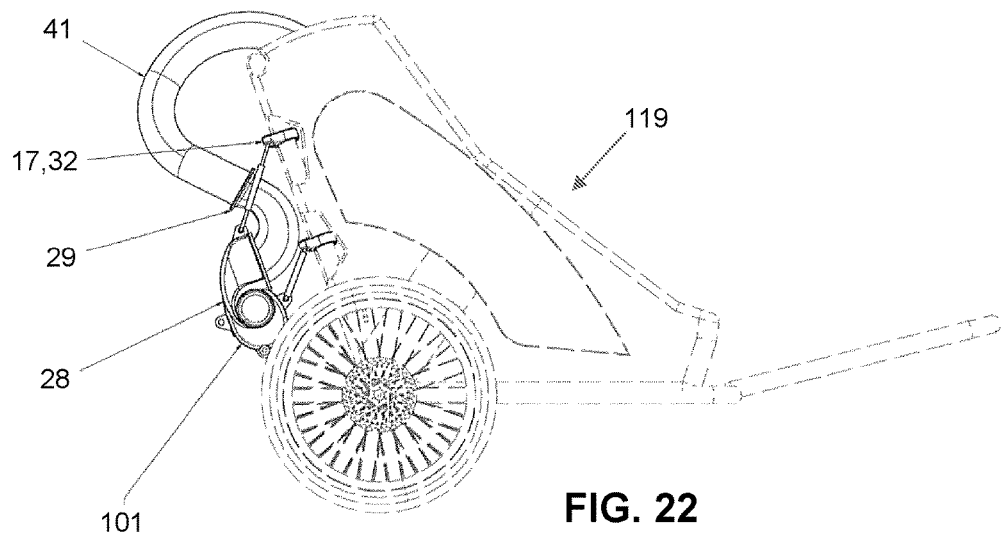
Figure 23:
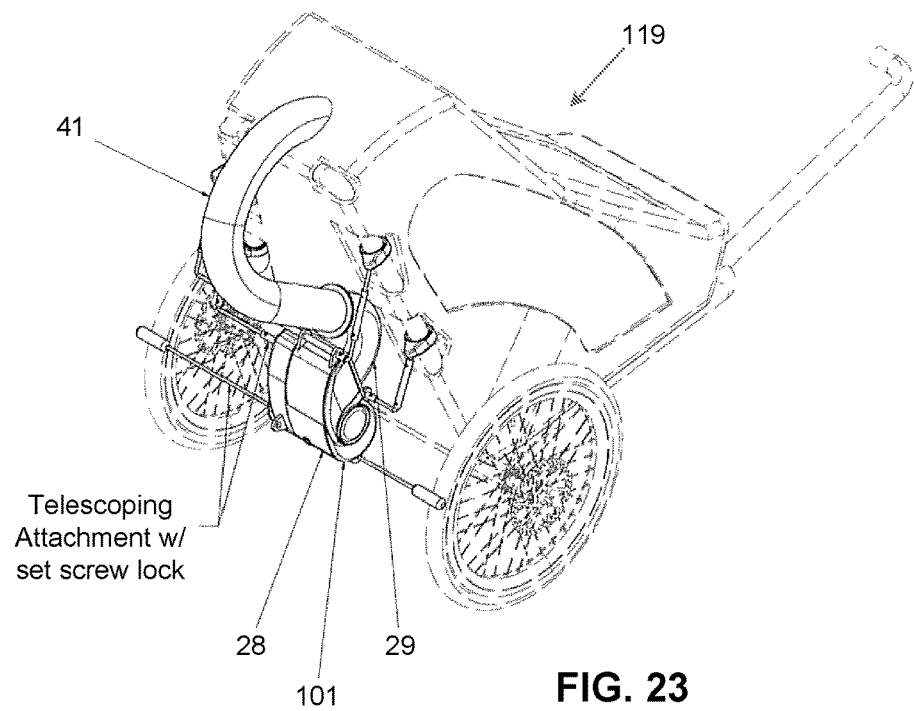

Referring now to FIGS. 17-23 in the drawings, views of system 101 and attachment device 111 coupled to a number of different transportation devices is illustrated. As seen in particular with FIGS. 17-18, device 111 is manipulated so as to permit system 101 to couple to the handles 114 of a push mower 115. Rods 16 may include a telescoping feature and optional locking positions to allow for a set length to be selected and secured. A set screw may be used in rod 16 to lock it into a set length for example. In order to properly direct the cooling airflow to the user of mower 115, a vent 41 may be attached to duct 29. System 101 may further include a clamp to support vent 41. The same capabilities are visible when the transportation device is a wheelchair 117, as seen in FIGS. 19-21. Additionally, the diverse method of attachment and functionality of device 111 is further seen in FIGS. 22 and 23 as system 101 is coupled to a bike trailer 119

In particular with FIGS. 24-34, system 101 is illustrated in a different relative position to the transportation device and therefore includes a modification. System 301 is similar in form and function to that of systems 101/201 except herein described. Whereas with systems 101/201, the relative location of itself to that of the tires/wheels of the transportation device was such that system 101/201 was between or adjacent the tires/wheels as opposed to being located directly above them. In situations where the cooling system of the present application is located above the tires/wheels, the system 301 includes a different power generation assembly. Gears 5-9 are maintained as well as the associated axles. However, axle 11 and inserts 14 are replaced with a downward telescoping wheel contact 121. Contact 121 is configured to operably connect and drive gears 5-9 to maintain the ability to generate cooling airflow. Contact 121 is configured to contact the side of a tire or wheel as oppose to the top of the tire/wheel.

Figure 24:
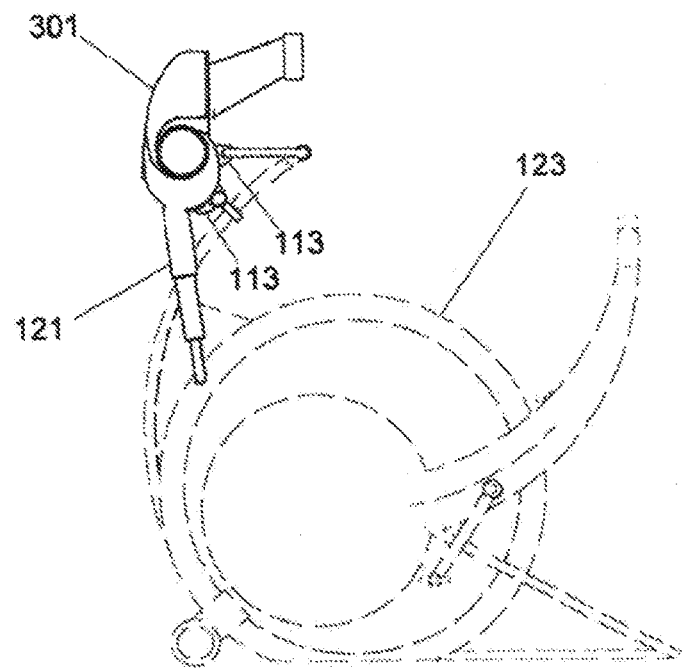
Figure 25:
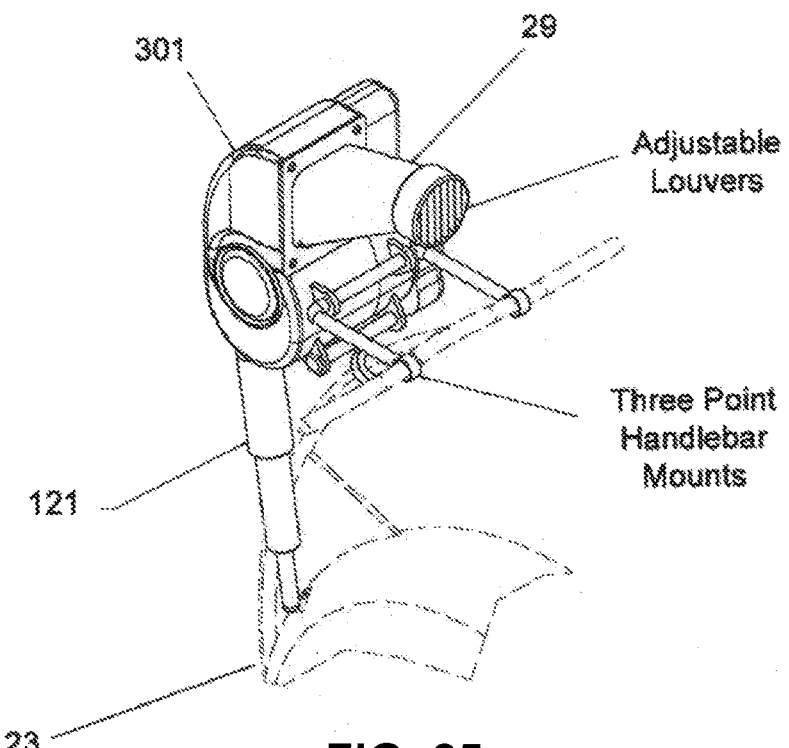
Figure 26:
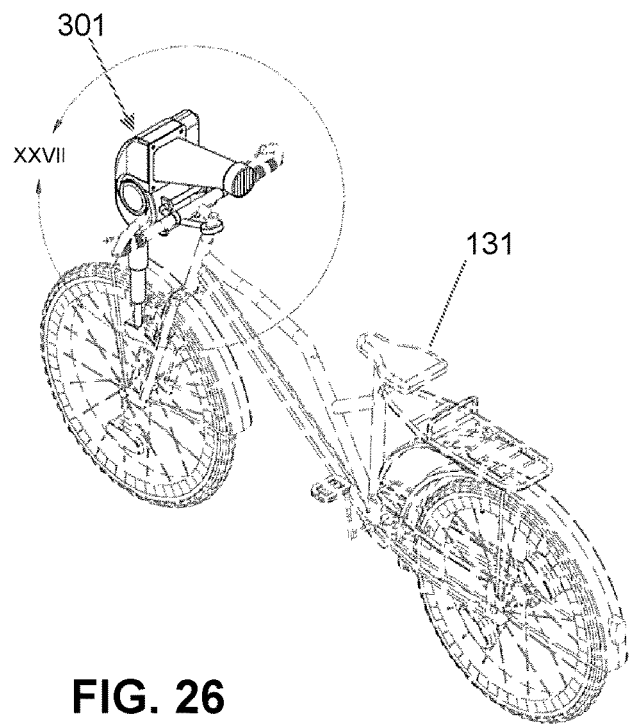
Figure 27:
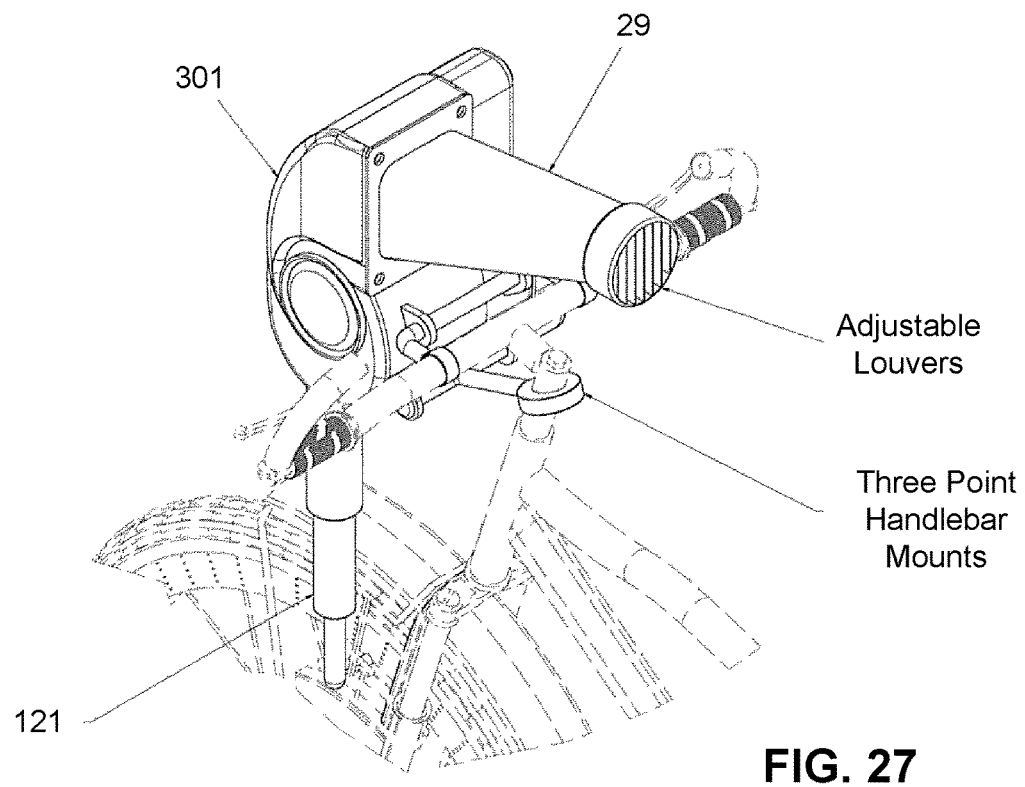
Figure 31:
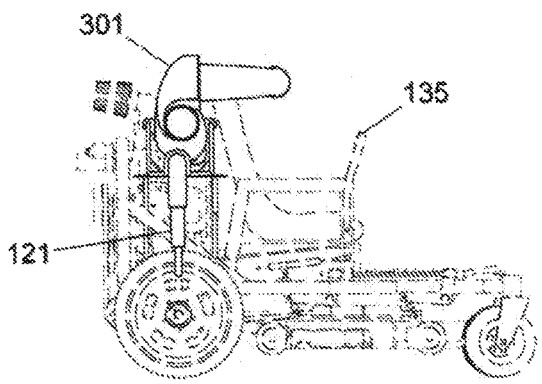
Figures 32, 33:
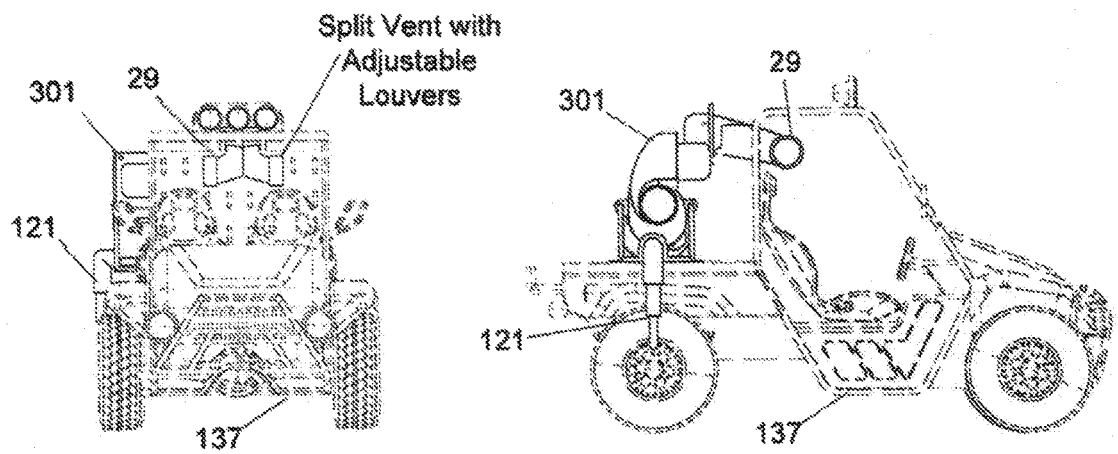
Figure 34:
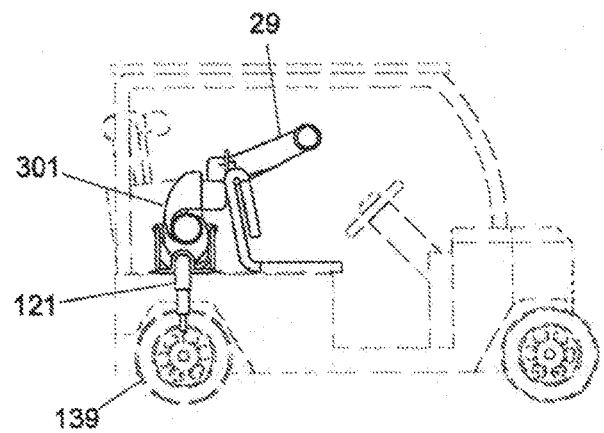

Additionally in FIGS. 24-34, a different embodiment of attachment device 111 is illustrated. Attachment device 311 also couples to system 101 through brackets 113. Device 311 may include the same parts and mechanisms but herein are shown as simplified rigid length mounting bars. They are customized to fit a particular transportation device. It is understood that the lengths may be adjustable as well in some embodiments. In FIGS. 24-25, system 301 is coupled to an exercise bike 123. FIGS. 26-27 illustrate system 301 and device 311 with a bike 131. A tractor 133 is shown in FIGS. 28-30 with system 301. Likewise, system 301 is shown is the following transportation devices: a riding mower 135 in FIG. 31, an all-terrain vehicle 137 in FIGS. 32 and 33; and a golf cart 139 in FIG. 34.

Some additional features of systems 101/201/301 are worth noting. Each system is configured to provide the ability to insert cooling elements like frozen water or cold packs to pre-cool the water and further the ability to decrease the temperature of the ambient air in the ducts. Additionally, a water dump for the water containment 22 is used to enable quick release of remaining water in order to better reduce risk of algae or bacteria breeding. This may occur through plug 19. Furthermore, the water and air within the fan system and water pump system may be filtered. In the case of the water pump system, this feature would be implemented in order to help prevent any mildew, bacteria, or mold, in the case of neglect in the changing, cleaning or replacement of parts requiring such attention, including draining the water containment after each use. With respect to the fan system, air filtering may be done on both intake and outputting ends, for concerns of air pollutants or less restrictive filters for sand and dust. In combination with the water pump system, each of the systems of the present application may also include a misting head coupled to an external portion of any of the housings to provide a mist to a user.

It is also understood that each of the present systems 101/201/301 may be configured to permit the selective use and disuse of the fan system and/or the water pump system individually without the other. When either system is not in need of use, any number of motion driven mechanisms can be disengaged, in order to disable the respective system until its use is needed and then motion driven mechanisms, previous disengaged, can now be reengaged and the apparatus can again be utilized.

The devices disclosed within the current application have many advantages over the prior art including at least the following: (1) portable cooling device; (2) the cooling system is interchangeable between transportation devices; and (3) ability to power the cooling system with a power supply.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

The invention claimed is:

1. A motion driven cooling system, comprising: a fan system configured to receive ambient air and generate an airflow through one or more ducts; a water pump system configured to move water relative to the fan system, the water pump system passing the water through a portion of the duct in order to decrease the temperature of the airflow; and an energy generation assembly in communication with a plurality of gears, the energy generation assembly configured to engage a transportation device and transfer energy to power the fan system and the water pump system; wherein powering the fan system and the water pump system provides an cooling airflow having a temperature lower than the ambient air; wherein the transportation device is a stroller; and the fan system and the water pump system is integrally formed into the stroller.

2. The motion driven cooling system of claim 1, wherein the fan system is configured to filter the airflow.

3. The motion driven cooling system of claim 1, wherein the water pump system is configured to filter the water.

4. The motion driven cooling system of claim 1, wherein the fan system and the water pump system are independently operable from one another.

5. The motion driven cooling system of claim 1, wherein the water pump system is configured to permit a user to insert one or more cooling elements into the water for pre-cooling.

6. The motion driven cooling system of claim 1, wherein the water pump system is configured to provide a misting spray to the user.

7. The motion driven cooling system of claim 1, further comprising:
a power supply to selectively provide power to the fan system and the water pump system independent of the motion of the transportation device, the power supply coupled to a motor assembly in communication with the gears.

8. The motion driven cooling system of claim 1, wherein the power generation assembly is configured to contact a top surface of a rotating member on the transportation device to receive energy.

9. The motion driven cooling system of claim 1, wherein the power generation assembly is configured to contact a side of a rotating member on the transportation device to receive energy.

10. The motion driven cooling system of claim 1, wherein the power generation assembly is operable while the transportation device is in motion.

11. The motion driven cooling system of claim 1, wherein the transportation device is a bicycle.

12. The motion driven cooling system of claim 1, wherein the transportation device is a lawn mower.

13. The motion driven cooling system of claim 1, wherein the transportation device is a golf cart.

14. The motion driven cooling system of claim 1, wherein the transportation device is an all-terrain vehicle.

15. The motion driven cooling system of claim 1, wherein the transportation device is an exercise bike.

16. The motion driven cooling system of claim 1, wherein the transportation device is a riding mower.

17. The motion driven cooling system of claim 1, wherein the transportation device is a wheelchair.

18. The motion driven cooling system of claim 1, wherein the transportation device is a tractor.

* * * * *